United States Patent
Hicks et al.

(10) Patent No.: US 7,306,018 B2
(45) Date of Patent: Dec. 11, 2007

(54) TREE HARVESTING APPARATUS

(75) Inventors: Keith B. Hicks, Somonauk, IL (US); Neil A. Roth, Plainfield, IL (US); Dennis D. Wetterich, Newark, IL (US)

(73) Assignee: Caterpillar Inc., Peoria, IL (US)

( * ) Notice: Subject to any disclaimer, the term of this patent is extended or adjusted under 35 U.S.C. 154(b) by 489 days.

(21) Appl. No.: 10/318,865

(22) Filed: Dec. 13, 2002

(65) Prior Publication Data

US 2004/0112463 A1    Jun. 17, 2004

(51) Int. Cl.
*A01G 23/08*    (2006.01)

(52) U.S. Cl. .................. 144/336; 144/356; 144/402; 144/404; 144/4.1

(58) Field of Classification Search .............. 144/4.1, 144/34.1, 34.5, 335, 336, 356, 402, 404
See application file for complete search history.

(56) References Cited

U.S. PATENT DOCUMENTS

| | | | |
|---|---|---|---|
| 3,735,788 A | 5/1973 | Coughran, Jr. | |
| 4,128,986 A | 12/1978 | Santarelli | |
| 4,414,795 A | 11/1983 | Johnstone et al. | |
| 4,987,733 A | 1/1991 | McCanse et al. | |
| 5,004,026 A * | 4/1991 | Mac Lennan et al. | 144/34.1 |
| 5,123,238 A | 6/1992 | Renehan | |
| 5,186,037 A | 2/1993 | Bihler | |
| 5,267,594 A * | 12/1993 | Wiemeri et al. | 144/34.1 |
| 5,469,695 A | 11/1995 | Zehavi et al. | |
| 5,697,412 A | 12/1997 | Kurelek | |
| 5,794,674 A | 8/1998 | Kurelek | |
| 5,931,210 A | 8/1999 | Kurelek | |
| 6,152,201 A | 11/2000 | Kurelek | |
| 6,363,980 B1 * | 4/2002 | Kurelek | 144/34.1 |
| 6,431,816 B1 * | 8/2002 | Jordan et al. | 414/636 |

FOREIGN PATENT DOCUMENTS

EP    0507640 A1    1/1992

\* cited by examiner

*Primary Examiner*—Shelley M. Self
(74) *Attorney, Agent, or Firm*—James R. Smith

(57) ABSTRACT

A tree harvesting apparatus is provided. The harvesting apparatus comprises a frame member, a cutting device mounted to the frame member, and at least one cutting member attached to the cutting device. A tree accumulation member is also provided and overlays at least a portion of the cutting device. Also provided is a tree securing device for securing at least one tree on the tree accumulation member, and an adjustment device for automatically adjusting the position of the tree securing device relative to the frame member.

17 Claims, 3 Drawing Sheets

_US 7,306,018 B2_

TREE HARVESTING APPARATUS

TECHNICAL FIELD

What is provided is a tree harvesting apparatus and, more specifically, a tree harvesting apparatus for severing and accumulating severed trees.

BACKGROUND

In the harvesting of trees, it is typical to mount a tree harvesting apparatus to the boom of a carrier vehicle such as a feller buncher or crawler tractor. The harvesting apparatus referred to herein is typically referred to as a harvesting or cutting head which typically employs a circular cutting saw to sever the tree, a means to grip and hold the tree, comprising a grapple and collector arm, and a base member which partially overlays the circular saw for supporting the tree off of the circular saw as the tree is being cut. Those cutting heads which accumulate the trees on the head itself oftentimes employ a tree accumulation area in which the severed trees are stored and transported. In recent years, machine productivity has become a major issue since the end users of such machines are increasingly under pressure to make a return on their investments in the forestry industry. To this end, it has been found to be desirable to reduce the number of tasks required by the operator while achieving the same productivity levels.

An example of a task that the operator must perform is to manually monitor the tree or trees stored in the accumulation area for any movement or jostling of the trees therein. Should sufficient movement of the trees occur such that the pressure applied by the one or more of the arms to trees is reduced, the operator must manually activate one or both of the arms accordingly to tighten the grip on the tree or trees so as to prevent inadvertent dropping of the trees from the tree harvesting apparatus or premature dumping of the trees by the operator.

The present invention is directed to overcoming one or more of the problems as set forth above.

SUMMARY OF THE INVENTION

In an embodiment of the present invention, a harvesting apparatus is provided. The harvesting apparatus comprises a frame member and a cutting device mounted to the frame member. A tree accumulation member is also provided and overlays at least a portion of the cutting device. Also provided is a tree securing device for securing at least one tree on the tree accumulation member, and an adjustment device for automatically adjusting the position of the tree securing device relative to the frame member.

In another embodiment of the present invention, a harvesting machine is provided. The harvesting machine comprises a carrier vehicle having circuit, and a harvesting apparatus coupled to the carrier vehicle and in communication with the circuit. The harvesting apparatus comprises a frame member and a cutting device mounted to the frame member. A tree accumulation member is also provided and overlays at least a portion of the cutting device. Also provided is a tree securing device for securing at least one tree on the tree accumulation member, and an adjustment device for automatically adjusting the position of the tree securing device relative to the frame member.

In yet another embodiment of the present invention, a method of automatically adjusting a retaining pressure applied to at least one tree is provided. The method comprises the steps of providing a harvesting apparatus having at least one tree securing device, a frame, and a cutting device; and providing an adjustment device for automatically adjusting the retaining pressure applied to the tree by the tree securing device when the tree is held by the harvesting apparatus.

DETAILED DESCRIPTION

Figure 1:
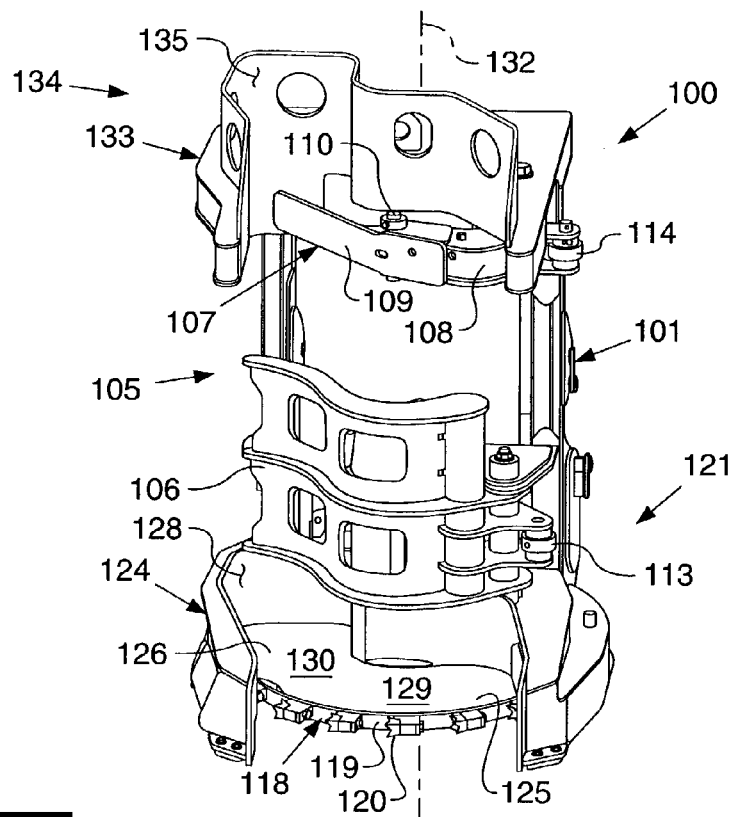
FIG. 1 is a perspective view of a tree harvesting apparatus incorporating the teachings of the present invention.
Figure 2:
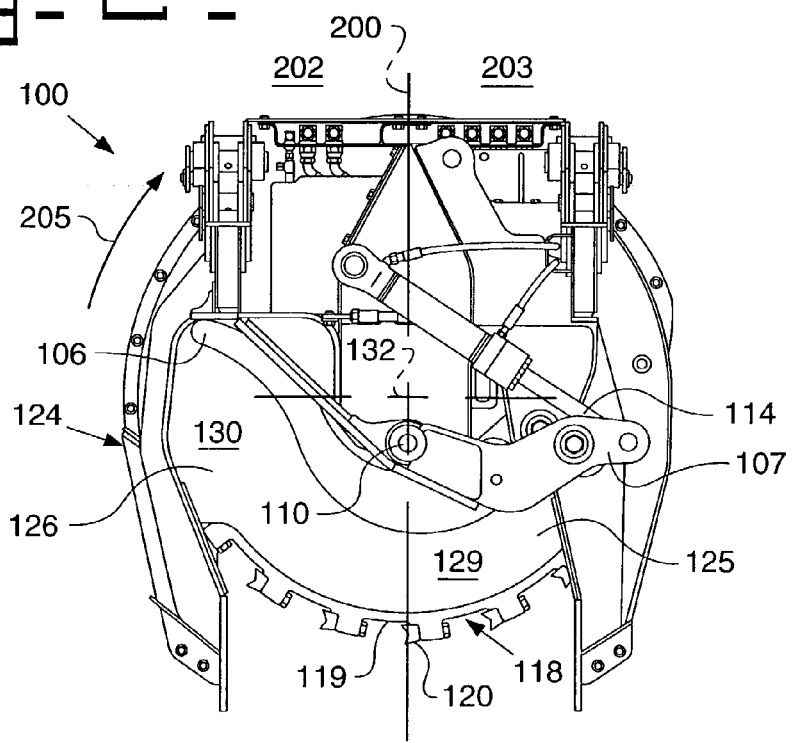
FIG. 2 is a top view of the tree harvesting apparatus of FIG. 1.

With reference now to the Figures, shown in FIG. 1 is a harvesting apparatus 100 of the present invention for use in cutting and transporting trees. The harvesting apparatus 100 includes a frame member 101, which is coupled in a conventional manner to a carrier vehicle (not shown). Attached to the frame member 101 is a tree securing device 105 which may comprise, in an embodiment described herein, a grapple arm 106 and a collector arm 107. The collector arm 107 includes a base portion 108 and an articulable portion 109 which articulates in a conventional manner, such as by use of a rubberband spring (not shown), about the pivot point denoted 110. Both the grapple arm 106 and collector arm 107 are pivotally movable relative to the frame member 101 by a movement imparting device which in an embodiment of the present invention comprises, respectively, a first hydraulic cylinder 113 and a second hydraulic cylinder 114. A cutting device 118 attached adjacent the bottom portion 121 of the frame member 101. As shown in FIG. 2, the cutting device 118 comprises a circular saw having a periphery 119 with at least one cutting member 120 or tooth mounted thereon. A shroud 124 is attached to the frame member 101 and partially encompasses the cutting device 118. The harvesting apparatus 100 further includes a base member 125 which is structured and arranged to partially overlay the cutting device 118, and a tree accumulation member 126, both of which define herein a support plate. Both the tree accumulation member 126 and the base member 125 are coupled to the shroud 124 by a suitable attachment method, and the combination of the shroud 124 and accumulation member 126 define an accumulation area 128 for accumulating the severed trees.

To support the weight of the severed trees, both the base member 125 and tree accumulation member 126 may comprise a metallic, plastic or other material with sufficient strength and durability. In an embodiment of the present invention, the base member 125 and tree accumulation member 126 comprise a unitary structure; however, such a showing is exemplary only and other arrangements such as providing each base and accumulation member 125,126 as a separate unit may also be utilized. The base member 125 and tree accumulation member 126 both include respective top surfaces 129 and 130 which, when both the base and accumulation members 125,126 are coupled to the shroud 124, lie in substantially the same plane. In order to maximize the storage area for storing severed trees, an embodiment of the present invention provides for an extension of the tree accumulation member 126 behind the centerline 132 of the harvesting apparatus (as shown best in FIG. 2). Additional storage area can be provided by extending the tree accumulation member 126 at least partially over the cutting members 120. A support member 133 is attached adjacent the frame top portion 134 and is provided with a recessed portion 135 for receiving and supporting the severed trees.

With further reference to FIG. 2, shown is a line 200 passing through the centerline 132 of the harvesting apparatus 100 dividing the harvesting apparatus 100 into a first side 202 and a second side 203. In an embodiment of the present invention, each of the grapple and collector arms 106,107 are coupled to the frame member 101 on the same side (e.g., second side 203 as shown) of the harvesting apparatus 100. It is to be understood that such a showing is exemplary only and that other arrangements may also be utilized without deviating from the spirit of the present invention. Such other arrangements may include, for example, coupling both grapple and collector arms 106,107 to the frame member 101 on the first side 202 or coupling the grapple arm 106 on the first side 202 and coupling the collector arm 107 on the second side 203, or vice versa.

Figure 3:
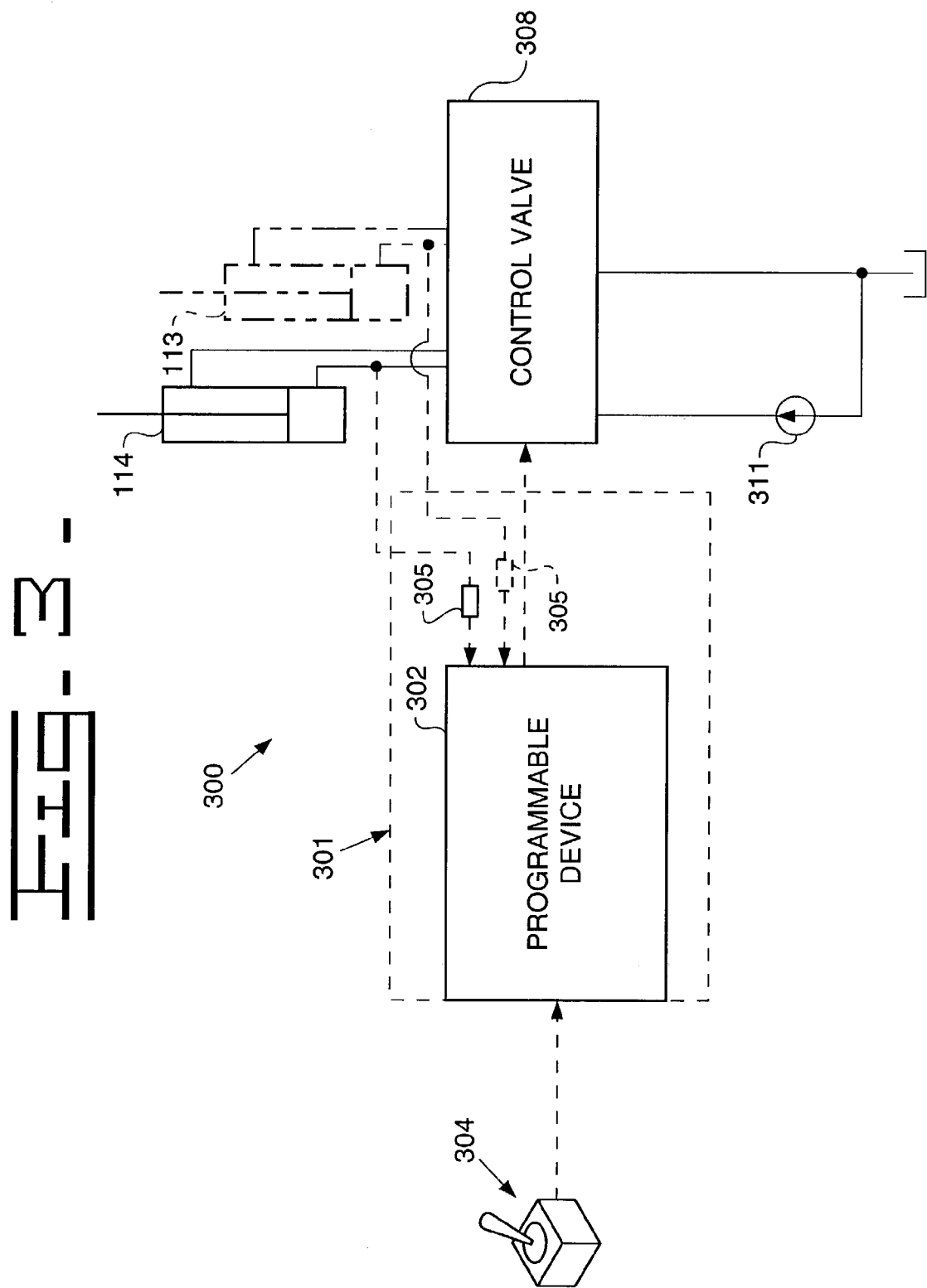
FIG. 3 is a diagrammatical view of a circuit for use with the tree harvesting apparatus of the present invention.

Shown in FIG. 3 is a diagrammatical representation of an exemplary circuit 300 that may be used to automatically control the movement of the collector arm 107. The circuit 300 includes an adjustment device 301 which comprises a programmable device 302 which may be the carrier vehicle's electronic control module (ECM) or a separate programmable device located on the harvesting apparatus 100 or the carrier vehicle. The adjustment device 301 may be activated by any suitable operator input device 304 such as joystick, switch, button or a toggle switch (as shown in FIG. 3) which may be located within the operator compartment (not shown) of the carrier vehicle or combined with the harvesting apparatus 100 itself. In another embodiment of the present invention, the adjustment device 301 may be configured such that it runs continuously during the operation of the harvesting apparatus 100. The adjustment device 301 further includes a pressure sensing device 305 which monitors the pressure acting on the second hydraulic cylinder 114 and responsively transmits a pressure signal to the programmable device 302. The pressure sensing device 305 may comprise a pressure switch, pressure sensor, or any suitable device adapted to detect pressure, or change thereof, in a hydraulic system and generate a signal in response thereto. Although the pressure sensing device 305 is shown coupled to the circuit 300 between the second hydraulic cylinder 114 and the programmable device 302, this showing is for exemplary purposes only and any suitable location on the circuit 300 may be chosen to locate the pressure sensing device 305 which may include locating the pressure sensing device 305 on either the harvesting apparatus 100 or the carrier vehicle.

A control valve 308 is adapted to receive command signals from the programmable device 302 and to adjust the pressure in the circuit 300 in response thereto. More specifically, the control valve 308 regulates the amount of hydraulic pressure being supplied to the second hydraulic cylinder 114 by a pump 311 in response to the command signal. If the resistance pressure acting on the second hydraulic cylinder 114 caused by contact of the collector arm 107 with the trees drops below a pre-set level that has been programmed into the programmable device 302, the programmable device 302 will cause the control valve 308 to increase the pressure being supplied to the head portion 312 of the second hydraulic cylinder 114. This, in turn, will cause the collector arm 107 to rotate, relative to the frame member 101, in the direction of arrow 205 (as shown in FIG. 2).

It is to be understood that the use of the second hydraulic cylinder 114 to control the movement of the collector arm 107 is exemplary only and that other means may be utilized. Such other means may include, for example, an electrical solution utilizing servo-motors or other like devices for adjusting the position of the collector arm 107 relative to the frame member 101. In this type of arrangement, it is contemplated that the circuit 300 may constitute an electrical circuit in which the adjustment device 301 comprises a device to sense a change in resistance in the circuit instead of hydraulic pressure. In another embodiment of the present invention, the circuit 300 may comprise a pneumatic circuit in which an air-activated device such as a solenoid may be used to control the movement of the collector arm 107, and the pressure sensing device 305 may be selected to monitor the air pressure in the circuit 300. It is also to be understood that the use of the adjustment device 301 of the present invention to control the movement of the collector arm 107 is exemplary only and that the principles described above may apply equally to the control of the first hydraulic cylinder 113 (as shown in alternate detail in FIG. 3), which controls the grapple arm 106, either alone or in combination with the control of the collector arm 107.

INDUSTRIAL APPLICABILITY

Figure 4:
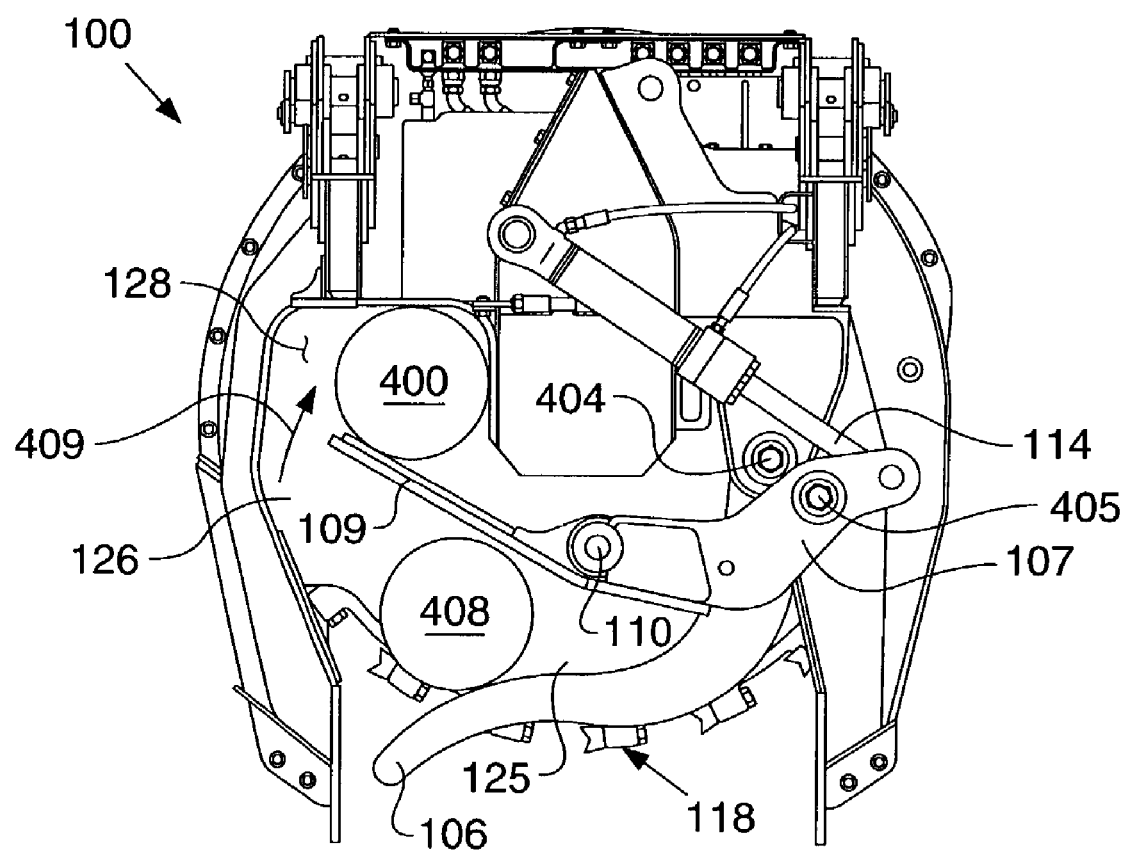
FIG. 4 is a top view of the tree harvesting apparatus shown holding and accumulating severed trees.

With reference to FIG. 4, the harvesting apparatus 100 of the present invention is used in conjunction with a carrier vehicle (not shown) to sever and transport trees. Activation of the cutting device 118 by the operator causes the tree 400 to be severed. Simultaneously therewith, hydraulic pressure is provided to each of the first and second hydraulic cylinders 113,114, causing the respective grapple and collector arms 106,107 to pivot about their respective pivot points 404,405, thereby forcing the severed tree 400 onto the base member 125. Continued actuation of the respective grapple and collector arms 106,107 forces the tree 400 into the accumulation area 128 and into approximately the position shown.

The above-identified process may be repeated if it is desired to sever subsequent trees, such as tree 408, while maintaining tree 400 in the accumulation area 128. Once the tree 408 is severed as set forth above, the collector arm 107 is withdrawn from its engagement with tree 400 by reversing the hydraulic flow to the second hydraulic cylinder 114. Simultaneously with the withdraw of the collector arm 107, the grapple arm 106 is activated so as to force the tree from the base member 125 to the accumulation member 126 causing tree 408 to contact the articulable portion 109 of the collector arm 107. The contact of the tree 408 with the articulable portion 109 causes the articulable portion 109 to rotate about pivot point 110 in the direction of the arrow 409; thereby un-tucking the collector arm 107 from between tree 400 and 408. Once un-tucked, the grapple arm 106 continues to position tree 408 into the accumulation area 128 adjacent tree 400. Once positioned, the collector arm 107 can once again be moved into a contact position with trees 400 and 408 in the aforementioned manner so as to secure the trees 400,408 for transport.

As noted previously, the adjustment device 301 of the present invention may be configured to operate continuously or it may be manually activated by an operator input device 304 such as a toggle, button, lever, or other type of switching device. Once activated, the adjustment device 301 monitors the pressure in the circuit 300 acting on the second hydraulic cylinder 114. As should be appreciated by those of ordinary skill in such art, should the tree or trees contained within the accumulation area 128 move or are otherwise jostled such that they lose some or all contact with the collector arm 107, the pressure sensing device 305 senses the change in retaining pressure provided by the collector arm 107 and communicates this loss of pressure to the programmable device 302. Should the retaining pressure equal or fall below a pre-set value stored in the programmable device 302, the programmable device 302 will instruct the necessary componantry of the circuit 300 to increase pressure to the second hydraulic cylinder 114, thereby causing the collector arm 107 to move until such time as the retaining pressure is once again above the pre-set amount. In so doing, inadvertent dropping of the trees by the harvesting apparatus 100 which may cause a loss in productivity may be prevented.

Other aspects, objects and advantages of this invention can be obtained from a study of the drawings, the disclosure and the appended claims.

What is claimed is:

1. A harvesting apparatus for harvesting trees, comprising:
a frame member;
a cutting device mounted to said frame member;
a tree accumulation member overlaying at least a portion of said cutting device;
a tree securing device for securing at least one tree on said tree accumulation member, wherein securing at least one tree on the tree accumulation member creates a pressure on said tree securing device;
a movement imparting device coupled to said tree securing device; and
an adjustment device, including a programmable device, coupled with said movement imparting device, adapted to automatically adjust the position of the tree securing device relative to said frame member in a response to a change in the pressure acting on said tree securing device.

2. The harvesting apparatus as set forth in claim 1 wherein said tree securing device comprises at least one arm.

3. The harvesting apparatus as set forth in claim 1 wherein:
said tree securing device comprises at least two arms; and
said adjustment device is operatively coupled with both said arms.

4. The harvesting apparatus as set forth in claim 1 wherein said adjustment device comprises a pressure sensing device coupled with said tree securing device and adapted to provide a pressure signal indicative of pressure applied to said tree securing device.

5. The harvesting apparatus as set forth in claim 4 wherein the programmable device is configured to receive said pressure signal and vary the position of the tree securing device in response thereto.

6. The harvesting apparatus as set forth in claim 5 wherein said programmable device varies the position of the tree securing device when said pressure signal at least equals a pre-determined value.

7. The harvesting apparatus of claim 1 wherein said movement imparting device comprises at least one of an electric, hydraulic, electro-hydraulic, or pneumatically powered device.

8. A tree harvesting machine for harvesting trees, comprising:
a carrier vehicle having a circuit; and
a harvesting apparatus coupled to said carrier vehicle and in communication with said circuit, said harvesting apparatus comprising:
a frame member;
a cutting device mounted to said frame member;
a tree accumulation member overlaying at least a portion of said cutting device;
a tree securing device for securing at least one tree on said tree accumulation member, wherein securing at least one tree on the tree accumulation member creates a pressure on said tree securing device;
a movement imparting device coupled to said tree securing device; and
an adjustment device, including a programmable device, coupled to said movement imparting device, for automatically adjusting the position of the tree securing device relative to the frame member in a response to a change in the pressure acting on said tree securing device.

9. The tree harvesting machine as set forth in claim 8 wherein said circuit comprises at least one of a hydraulic circuit, an electric circuit, an electro-hydraulic circuit, or a pneumatic circuit.

10. The tree harvesting machine as set forth in claim 8 wherein said tree securing device comprises at least one arm.

11. The tree harvesting machine as set forth in claim 8 wherein:
said tree securing device comprises at least two arms; and
said adjustment device is operatively coupled to both said arms.

12. The tree harvesting machine as set forth in claim 8 wherein said adjustment device comprises a pressure sensing device coupled to said circuit and adapted to provide a pressure signal indicative of pressure applied to said tree securing device.

13. The tree harvesting machine as set forth in claim 12 wherein the programmable device is configured to receive said pressure signal and vary the location of said tree securing device in response thereto.

14. A method of automatically increasing a retaining pressure applied to at least one tree by a harvesting apparatus having at least one tree securing device, a frame, and a cutting device, comprising the step of providing an adjustment device for automatically increasing the retaining pressure above a pre-set level, in a response to a change in a pressure acting on said tree securing device, applied to the tree by the tree securing device when the tree is held by the harvesting apparatus.

15. The method of claim 14, further comprising the step of providing a pressure sensing device for monitoring the retaining pressure provided to at least one tree by the tree securing device and transmitting a pressure signal in response thereto.

16. The method of claim 15, further comprising the step of providing a programmable device for receiving the pressure signal and adjusting the position of the tree securing device relative to the frame in response to a change in said retaining pressure.

17. The method of claim 15, further comprising the step of providing a programmable device for receiving the pressure signal and adjusting the position of the tree securing device relative to the frame in response to a said pressure signal indicating a restraining pressure that has dropped below the pre-set level.

* * * * *